United States Patent [19]

Cerboni

[11] Patent Number: 5,569,472
[45] Date of Patent: Oct. 29, 1996

[54] CONTINUOUSLY-OPERATING CHILLING CABINET FOR TREATING A MASS CONTAINED IN MOLDS

[75] Inventor: Renzo Cerboni, Milan, Italy

[73] Assignee: Carle & Montanari S.p.A., Milan, Italy

[21] Appl. No.: 350,403

[22] Filed: Dec. 5, 1994

[30] Foreign Application Priority Data

Dec. 3, 1993 [IT] Italy .................. MI93A2549

[51] Int. Cl.⁶ ...................... B29C 39/06; A23G 1/26
[52] U.S. Cl. .......... 425/404; 425/454; 425/457; 425/DIG. 201; 249/120; 249/126; 426/524
[58] Field of Search .................. 425/453, 454, 425/457, DIG. 200, DIG. 201, 384, 404; 249/120, 126; 426/524

[56] References Cited

U.S. PATENT DOCUMENTS

| | | | |
|---|---|---|---|
| 3,082,709 | 3/1963 | Jacobsen | 425/453 |
| 3,778,018 | 11/1973 | Abalo | 425/453 |
| 3,981,656 | 9/1976 | Steels et al. | 425/453 |
| 4,008,032 | 2/1977 | Pahl | 425/246 |
| 4,009,858 | 3/1977 | Borsuk et al. | 249/126 |
| 4,135,872 | 1/1979 | Cerboni | 425/453 |
| 4,330,245 | 5/1982 | Billett et al. | 425/137 |
| 4,954,069 | 9/1990 | Friedwald | 425/218 |
| 5,329,350 | 7/1994 | Chu | 249/126 |

FOREIGN PATENT DOCUMENTS

| | | |
|---|---|---|
| 838433 | 3/1939 | France. |
| 1347833 | 3/1964 | France. |
| 631142 | 6/1936 | Germany. |
| 705070 | 4/1941 | Germany. |
| 3618904A1 | 12/1987 | Germany. |
| 300990 | 9/1965 | Netherlands. |
| 731323 | 5/1975 | Netherlands ............... 425/453 |
| 816750 | 3/1981 | U.S.S.R. ................... 425/454 |

Primary Examiner—Khanh P. Nguyen
Attorney, Agent, or Firm—Kirschstein et al.

[57] ABSTRACT

Continuously-operating chilling cabinet for treating a mass contained in molds, for example a chocolate mass or the like, such that after the entrance of the chilling cabinet is a device for lifting the molds as they are fed in and stacked and, in an adjacent position, before the exit from the chilling cabinet is a device for lowering the stacked molds. Above the lifting and the lowering device is a mechanism for holding and releasing the lowest mold of the corresponding stack. Above the stacks, the chilling cabinet houses a horizontal carrier that conveys the molds contained in the top row of the ascending column towards the top of the column made up of descending molds.

7 Claims, 8 Drawing Sheets

CONTINUOUSLY-OPERATING CHILLING CABINET FOR TREATING A MASS CONTAINED IN MOLDS

BACKGROUND OF THE INVENTION

The present invention relates to a continuously-operating chilling cabinet for treating a mass contained in molds, for example a chocolate mass or the like.

It is known in the prior art that in order to make chocolates or chocolate bars, molds are used that comprise a plurality of wells which are filled with a fluid chocolate mass that is then set by passing it through a chilling plant.

On this subject, molding plants have become known, comprising parallel chains for conveying the molds that are filled inside a metering machine with the chocolate mass that is to be cooled.

Downstream of the metering machine, the parallel chains convey the molds in the manner of a paternoster lift through a chilling cabinet and, at the exit from the chilling plant, the molds containing the set food product are conveyed, for example, to an inverting station where the finished product is emptied out.

Known refrigerating plants use two parallel chains that engage with guides suitable for accommodating the molds as they enter the chilling cabinet. Inside the cabinet, the parallel chains first execute an ascending movement before their direction is altered near the top of the cabinet and they move along a horizontal path, at the end of which the direction of the chains is again altered to enable a subsequent descending movement and discharging of the molds, which are transferred to other conveying means.

Moving the molds (containing the product to be treated inside the chilling cabinet) by means of parallel chains moving in the manner of a paternoster lift, that is upwards, horizontally along, and downwards, has a number of disadvantages.

It is known that the dwell time of a particular product inside the chilling cabinet is decided when a plant is at the design stage, i.e. for a certain type and a particular quantity of product.

Experience teaches, however, that not all products require the same dwell time in the chilling cabinet, or in other words products require different cooling from the thermal point of view.

These needs are difficult to satisfy in paternoster lift-type cooling plants as it is very difficult to maintain the ideal thermal conditions which follow a specific curve characteristic of the cooling of the chocolate. These difficulties of achieving the right conditions arise whenever the plant cannot be run at the maximum productive speed for which it was designed. The maximum speed cannot be exploited fully with, for example, products that differ from those for which the molding plant was designed.

Hence the disadvantage that the chilling plants currently in use offer very poor flexibility from the technical point of view.

Furthermore the means such as chains, guides, shafts, walls and separators obstruct the ideal movement of air through the columns made up of the molds to be cooled, and in addition a considerable amount of thermal energy (units of cold) will be absorbed by and thus lost in the metal parts such as for example chains, guides, shafts or transmission mechanisms situated inside the chilling cabinet and continuously swept by the stream of cold air.

When using parallel chains as the means of conveying the molds through the chilling plant, it becomes understandable that the distance (pitch) between the mold supporting and lifting guides will have to be fixed. As a result, once the pitch between one mold and the next has been decided at the design stage, it will not be possible to use molds with variable dimensions, for example molds with greater thickness as required when molding larger chocolate objects.

Moreover, in paternoster lift-type chilling cabinets the molds will have to be moved along obligatory paths, i.e. they ascend a predetermined distance, before travelling along a horizontal section and then redescending down a vertical section. This requirement obviously limits the possibility of configuration of the entire molding line.

Another disadvantage typical of paternoster lift-type conveying systems is the complexity of the drive means and mechanisms.

In order to be able to produce an intermittent movement of the chains moving up and down inside the chilling cabinet, it is essential to provide cam mechanisms, boxes with special gears, drive shafts and very expensive chains. It is also necessary that the vertical movement of the molds be precisely synchronized with all the means for the horizontal conveyance of the molds; these synchronizing devices often throw up problems.

It should also be noted that food hygiene inside known chilling cabinets leaves much to be desired.

The air used for cooling the chocolate not only strikes the molds containing the product but also sweeps the conveying chains, their guides and the chain transmission mechanisms, generating an inevitable contamination of the product owing largely to residues of lubricant coming off the chains and transmission wheels, and similarly with particles of dirt that have been deposited on the chains or on their guides. There is consequently a detectable decline in product quality after the product has passed through the chilling plant.

The complexity of paternoster-type conveyors, requiring the installing of a plurality of mechanical units inside the chilling cabinet, is a hindrance to the easy periodical cleaning of the rotating units and necessitates a considerable period of time for the continuous cleaning of the supporting guides that accommodate the molds, along which guides residues of chocolate generally accumulate.

Another disadvantage which characterizes known conveyors is that during the conveyance through the chilling cabinet, the molds lose the mutual pitch—that is the distance between one mold and the next—with which they were fed in by the incoming conveyor. This fact requires the provision of very complicated and expensive synchronizing devices, partly in order that the molds can be redeposited with the desired pitch on the outgoing conveyor.

The prior state of the art has disclosed the use of a chilling cabinet comprising at least three individual magazines suitable for accommodating the molds containing the product to be cooled. Of these magazines, the middle one can be moved vertically, so allowing a gradual meandering movement the molds between the surfaces of the side magazines, thereby conveying the molds upwards and downwards. With this known solution, both the engineering demands and the space requirements are considerable, and moreover the need to give the molds a meandering movement during the setting process can give rise to the formation of waves on the surface of the product or make the molded objects conical.

Moreover, it will be necessary for the molds to enter and exit always in the same direction with respect to the chilling plant, and this limits the flexibility of the molding line. The volumes required for the chilling cabinet are great, because between the fixed side magazines it will be necessary to provide another intermediate magazine for the temporary stopping of the molds. Lastly, it is not possible to create areas of variable temperature, even though this is a requirement of a modern cooling cycle for a chocolate product of quality.

SUMMARY OF THE INVENTION

It is therefore an object of the present invention to overcome the disadvantages of the prior state of the art and to propose a chilling cabinet of the type indicated, having no conveying chains, enabling molds of variable thickness to be fed in, and greatly simplifying the structure in the interior of the chilling cabinet, while simultaneously facilitating the periodical cleaning of the chilling cabinet and consequently improving food hygiene in the interior of the unit, as well as making it possible to improve the thermal efficiency of the plant, adapt the climatic conditions to the product and vary the dwell time of the product inside the chilling cabinet.

According to the invention, this object will be achieved in the fact that after the entrance of the chilling cabinet is a device for lifting and stacking the molds as they are fed in and, in an adjacent position, before the exit from the chilling cabinet is a device for unstacking and lowering the molds ready for discharging, that above the lifting device and above the lowering device is a mechanism for holding and releasing the lowest mold of the corresponding column of molds and that above the columns of molds, the chilling cabinet houses a horizontal carrier that conveys the forms contained in the top row of the ascending column towards the top of the column made up of descending forms.

With particular advantage, the means for feeding the molds in and discharging them consists of a conveying screw that engages with a stud projecting from each molding form, which screw traverses the interior of the chilling cabinet.

The provision of a controllable mold-lifting device means that the molds can be lifted a small height inside the chilling cabinet and so disengaged from the conveying screw in order to be transferred to a holding device and formed into a column consisting of a plurality of molds on top of each other.

As more molds are fed in and lifted from below, the column grows towards the top of the chilling cabinet until it reaches a carrier, which is freely positioned at a desired level. This horizontal carrier takes the top molds of the column made up of ascending molds, and transfers them towards the top of the column made up of descending molds.

By means of a device for holding the entire column of stacked molds, it is always the bottom mold that will be transferred to a lowering device, so that the mold can be re-engaged with the conveying screw and so that the molds can thus be discharged.

BRIEF DESCRIPTION OF THE DRAWINGS

The subject designed according to the present invention will now be described in greater detail in the form of an embodiment provided purely by way of an example and illustrated in the attached drawings, in which.

DETAILED DESCRIPTION OF THE PREFERRED EMBODIMENTS

Figure 1:
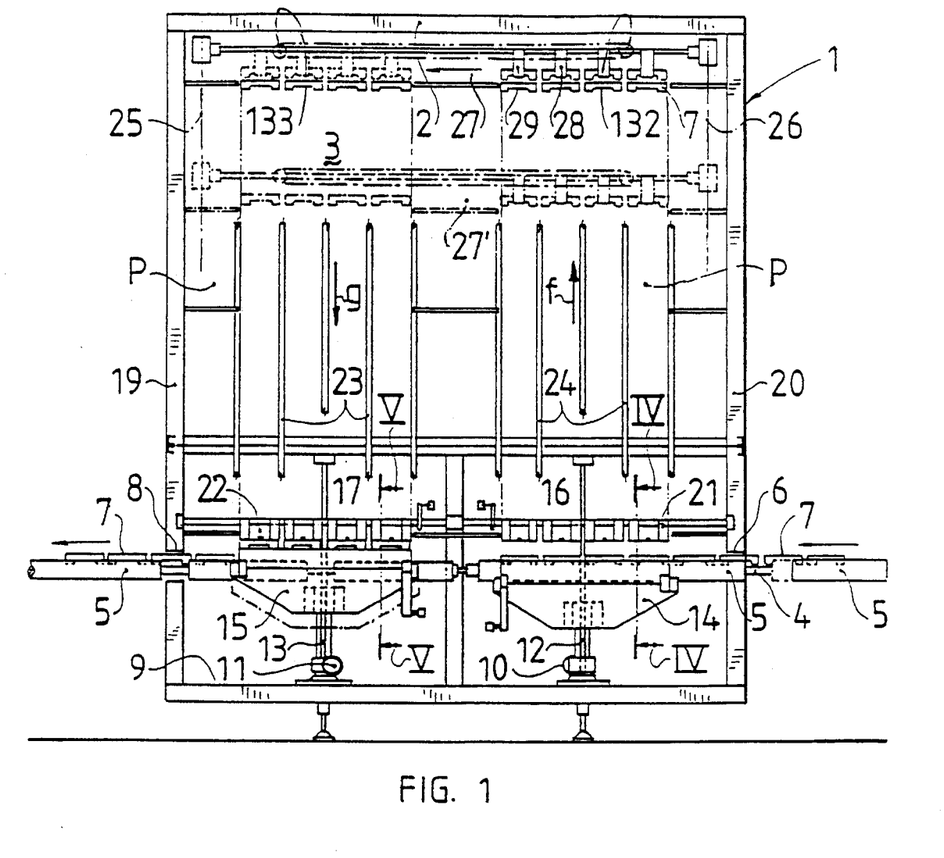
FIG. 1 shows a front view of the chilling plant designed according to the present invention, with one wall of the chilling cabinet structure removed.

As can be seen in FIG. 1, the chilling cabinet, indicated as a whole by the numeral 1, consists of a frame and walls 2 forming a closed chamber 3.

Below, the chamber 3 of the chilling cabinet 1 is traversed by a preferably horizontal drive shaft 4 accommodating conveying screws 5, which are made to rotate by the shaft 4, so that the molds 7 containing the product requiring thermal treatment are fed through with the desired sequence and speed.

Likewise by means of the screw 5 that traverses the chilling cabinet 1, the molds 7 are discharged from the chamber 3 through a discharge aperture 8.

At the base 9 of the chilling cabinet 1 are lifting and lowering means 10 and 11 consisting advantageously of electromechanical jacks comprising actuating pistons 12, 13. Each piston 12, 13 supports a platform 14 and 15 respectively, each platform being made advantageously from sheet metal and having a U-shaped transverse section.

Housed between the ascending arms of the U-shaped platforms 14, 15 is the shaft 4 supported by the structure 2 and accommodating the conveying screws 5, with which the molds 7 engage.

It is also advantageous to guide the platforms 14 and 15 on both sides by means of vertical columns 16 and 17, whose top ends are fixed to transverse members 18 of the structure 2.

Fixed to the uprights 19 and 20 of the structure 2 of the chilling cabinet 1 are mold holding devices consisting basically of gripping means activated in a controlled manner and indicated by 21 and 22. These devices 21, 22 are made in the form of arms able to pivot from an open position to a closed position and to support an entire column P made up of the stacked molds 7.

The device 21 is constructed in such a way that it can continuously load molds 7 from below, using the platform 14, while the device 22 is built in such a way that it can transfer the lowest molds 7, which will be situated on the platform 15.

Although in FIG. 1 the drawing shows the forms being fed from right to left, entering through the aperture 6 and leaving the chilling cabinet through the exit 8, it will be obvious that the direction in which the forms 7 are fed through can also be reversed, in other words the forms 7 can also be fed in from the left side of the chilling cabinet 8 and discharged from the chamber of the chilling cabinet 1 through the aperture 6 (in which case column (g) will of course execute an ascending movement while column (f) will execute a descending movement).

The vertical walls of the structure 2 of the chilling cabinet 1 support vertical guide bars or rods 23 and 24 whose function is carefully to guide the molds 7 during their ascending or descending movements. Simultaneously the bars or rods 23, 24 function as means suitable for keeping the forms 7 at a constant mutual distance, that is at the same mutual pitch with which the forms 7 are fed in by the conveying screw 5.

Figure 2:
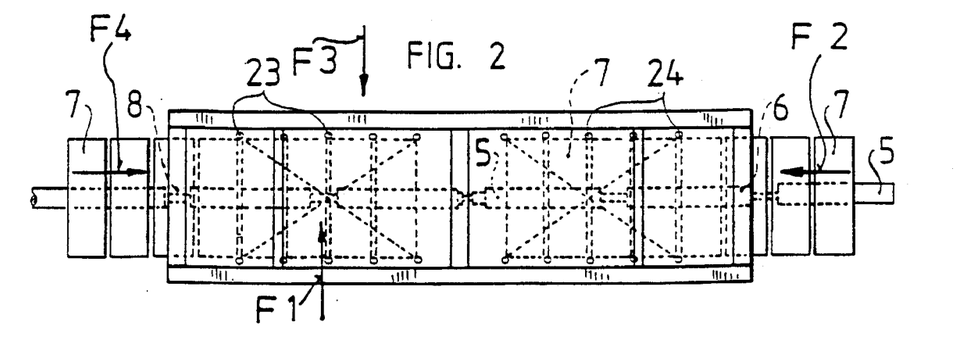
FIG. 2 shows a plan view of the chilling cabinet.

As can be seen in FIG. 2 the special structure of the chilling cabinet 1, and also the stacked or columnar arrangement (P) of the forms 7 makes it possible to strike the product contained in the forms 7 with the cold stream from all sides of the chilling chamber, as indicated diagrammatically in FIG. 2 by arrows F1, F2, F3 and F4.

The result achieved by this means is excellent conditioning and cooling of the product.

Figure 3:
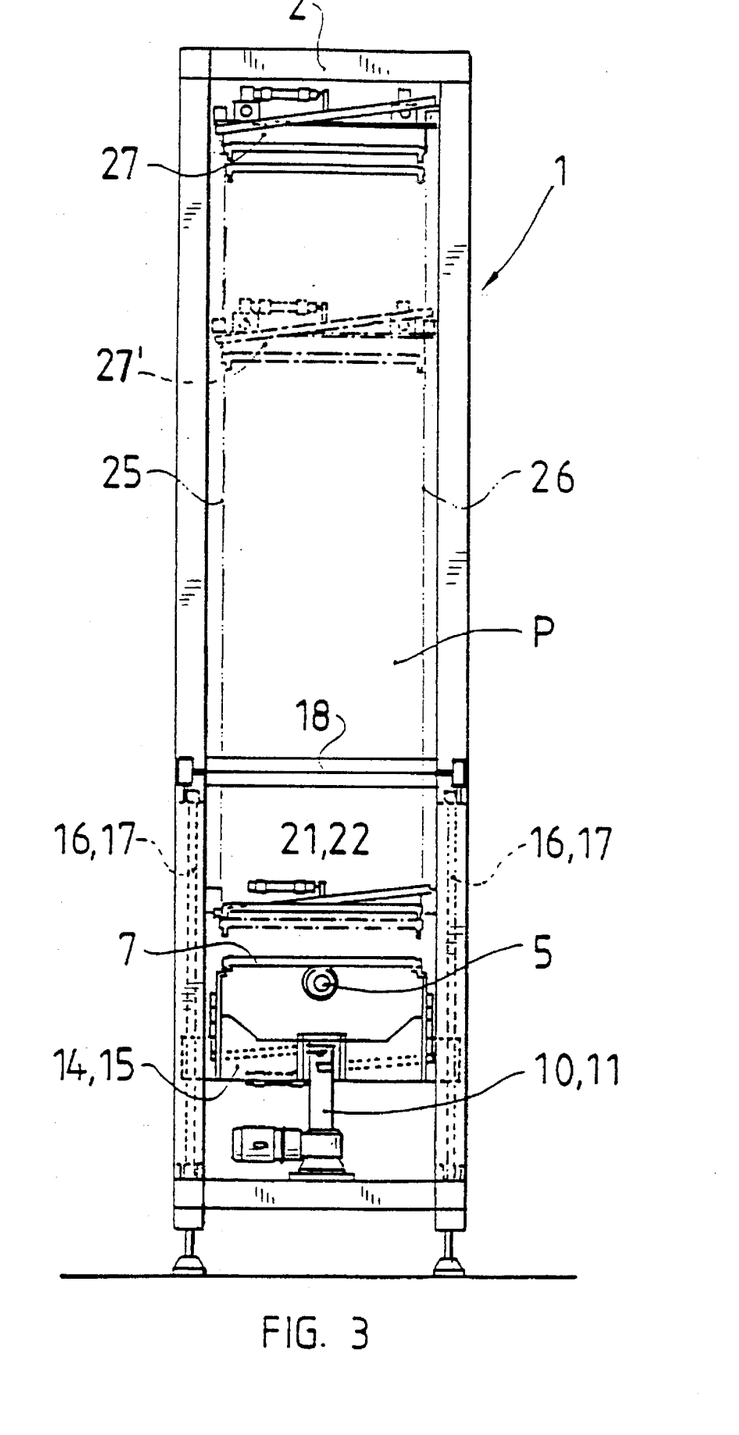
FIG. 3 shows a front view of the narrow side of the chilling cabinet with one wall removed.

Visible in FIG. 3 is the structure 2 of the chilling cabinet 1 in a side view with one wall removed for clarity of illustration.

Clearly visible is the position of the conveying screw 5 by which the molds 7 are fed in. A series of molds 7 is positioned on top of the platform 14, which is a U-shaped construction.

By means of the platforms 14, 15, the molds 7 can be moved along a vertical axis with the aid of a lifting device 10, 11 respectively mounted at the base of the structure 2 of the chilling cabinet 1. The sides of the platforms 14, 15 are in a sliding connection with vertical guides 16, 17 respectively attached to transverse members 18 of the structure 2 of the chilling cabinet 1.

Above the platforms 14, 15 in a fixed position relative to the structure 2 of the chilling cabinet 1 is the controllable device for holding the column P of molds 7. The holding device is indicated as a whole by the references 21, 22 respectively.

Vertical guides, for example threaded shafts 25, 26 accommodate in an adjustable manner a carrying unit 27 which, from a position indicated in solid lines, can be adjusted as indicated by broken lines 27'.

The horizontal carrying unit 27 comprises a carriage 28 equipped with controllable gripping members 29 that can grasp the molds 7 of the corresponding column P, passing these molds 7 from the ascending column (arrow f) to the top of the descending column P (arrow g).

Figure 4:
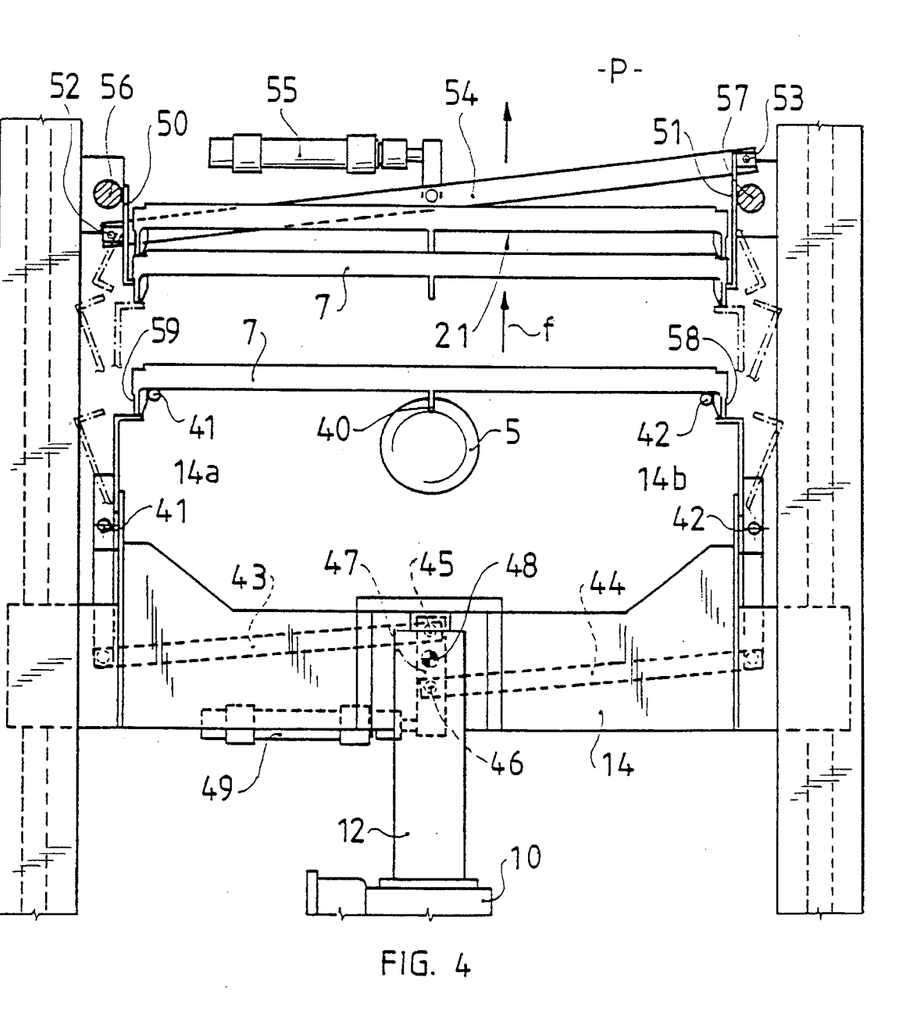
FIG. 4 shows a detail illustrating the mold lifting and holding device in a view taken through the line IV—IV of FIG. 1.

Visible in greater detail in FIG. 4 is the controllable lifting device consisting of the electromechanical jack 10, whose piston 12 acts on the basically U-shaped lifting platform 14.

Positioned in the centre of the platform 14 (which can be raised and lowered) is the conveying screw 5 with which there engages a stud 40 projecting from the mold 7, which advances on rods 41 and 42 forming parallel guides.

The vertical arms 14a and 14b of the platform 14 are advantageously crank-shaped, thus providing a supporting surface for the molds 7, and are supported in a pivoting manner by pivots 41 and 42. The bottom ends of the arms 14a and 14b are connected to levers 43 and 44 hinged at points 45 and 46 to a plate 47 able to pivot about a pivot 48.

The free end of the plate 47 is connected to a cylinder-and-piston unit 49, by means of which the system can be actuated, enabling the arms 14a, 14b to pivot outwards (as indicated in broken lines) from the position indicated in solid lines, holding the mold 7 in one position and releasing the mold 7 in the other position.

Above the platform 14, 15 is the holding device 21 which, with the molds 7 fed in the direction indicated by the arrow (f), enables a column P of stacked molds 7 to be formed.

The device 21 comprises L-shaped arms 50 and 51, and said arms 50, 51, which can pivot about pins 56, 57, are hinged at points 52 and 53 to the ends of an inclined actuating bar 54 actuated by means of a controllable actuating means, such as a cylinder-and-piston unit 55. The pivots 52 and 53, and the positioning of the arms 50, 51 and of the bar 54, is so selected that the actuation of the cylinder-and-piston unit 55 causes the arms 50, 51 to execute either an opening movement or a closing movement, as indicated in solid lines and broken lines in FIG. 4.

In order to permit a reliable connection between the opposite ends of the molds 7 and the L-shaped arms 50, 51, the opposite ends of the molds 7 have step-like recesses 58, 59 enabling a reliable geometric coupling between mold 7 and arm 50, 51.

Figure 5:
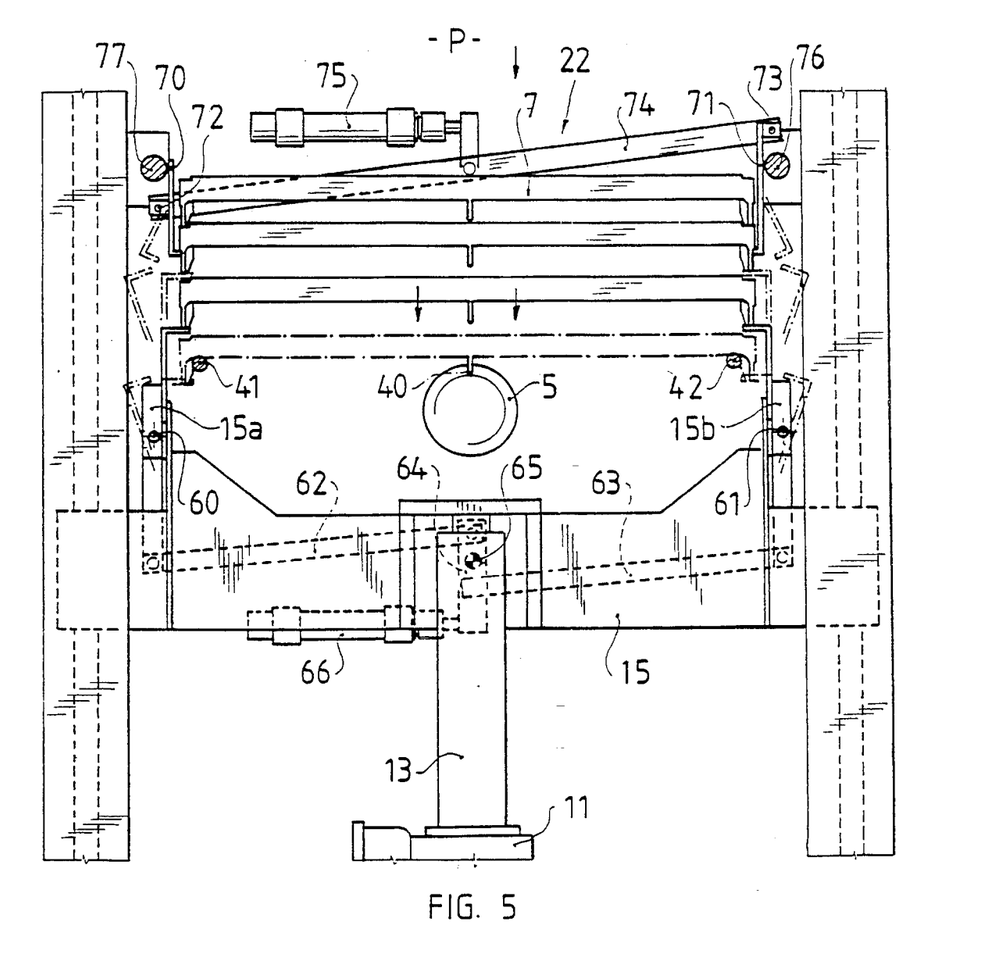
FIG. 5 shows the mold lowering device in a view taken through the line V—V of FIG. 1.

Illustrated diagrammatically in FIG. 5 is the device for holding and transferring the molds 7 to the platform 15 beneath.

The platform 15 comprises an electromechanical jack 11, the piston 13 of which is connected to the U-shaped platform 15. The platform 15 comprises side arms 15a and 15b that can be pivoted in a controlled manner about pivots 60 and 61. The bottom ends of the arms 15a, 15b are connected to a lever 62, 63 respectively, and the ends of the levers 62, 63 are connected in a jointed manner to a plate 64 that can be pivoted about a central pin 65. The plate 64 is connected at its bottom end to a cylinder and piston unit 66 that makes it possible to act in a controlled manner on the levers 62, 63 to pivot the arms 15a, 15b in such a way that they execute an opening movement or a closing movement, as indicated in dot-dash lines in FIG. 5.

The device 22, the function of which is to lower the forms, and which is positioned above the platform 15, comprises L-shaped arms 70 and 71 that can be pivoted in a controlled manner about pins 76, 77.

In the closed position the arms 70, 71 lock the lowest molds 7 of the column P of stacked molds 7, whereas these molds 7 are unlocked when the arms 70, 71 are open.

The mold 7 conveying screw 5 is again in the centre of the platform 15.

The arms 70, 71 are advantageously connected in a jointed manner at points 72, 73 respectively to an inclined actuating bar 74, which is connected functionally to a cylinder-and-piston unit 75, while the ends of the bar 74 are connected to the arms 71, 72 as illustrated.

By actuating the cylinder and piston unit 75, it will therefore be possible to pivot the L-shaped ends of the arms 70, 71 of the transferring device 22 in order to always release the lowest molds 7, when the platform 15 with its arms 15a, 15b is close to the lowest molds 7.

During the descending movement of the piston 13 of the jack 11, the molds 7 will be conveyed downwards and are positioned on the parallel guides 41, 42. Furthermore the stud 40 projecting from each mold 7 geometrically couples with the turns of the rotating conveying screw 5, enabling the molds 7 to be carried away.

Figure 6:
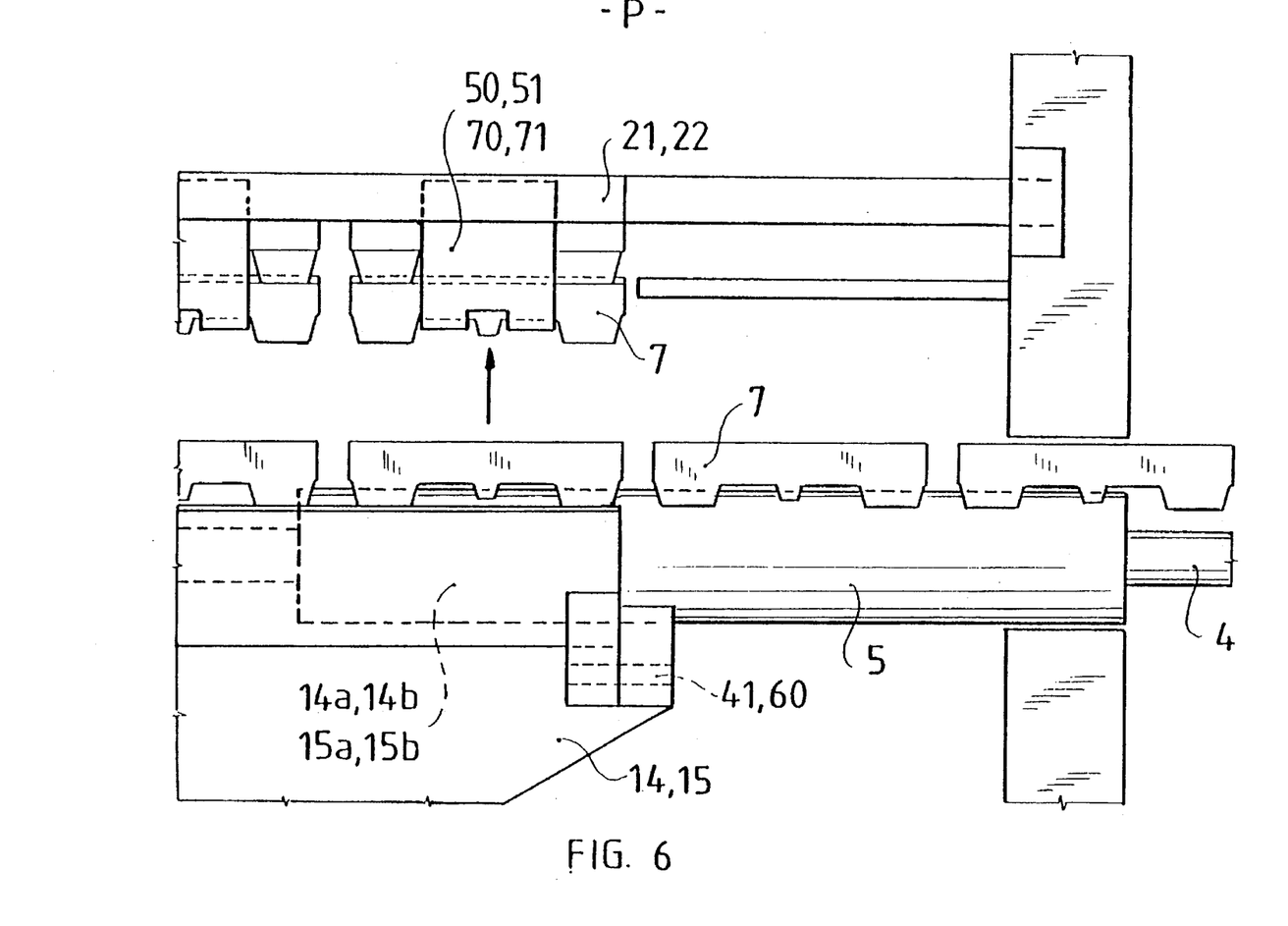
FIG. 6 shows a view of a detail of the device for supporting the stack of molds.

Illustrated in the detail shown in FIG. 6, is the actuating shaft 4 of the conveying screws 5 for conveying the forms 7. Part of platforms 14 and 15 is also illustrated.

Each platform 14, 15 supports in a pivoting manner, for example about a pivot 41, 60, the arms 14a, 14b or 15a, 15b.

It can also be seen in FIG. 6 that above the platforms 14, 15 is the corresponding holding device 21, 22 respectively for supporting the column P made up of the molds 7 stacked on top of each other.

Figure 7:
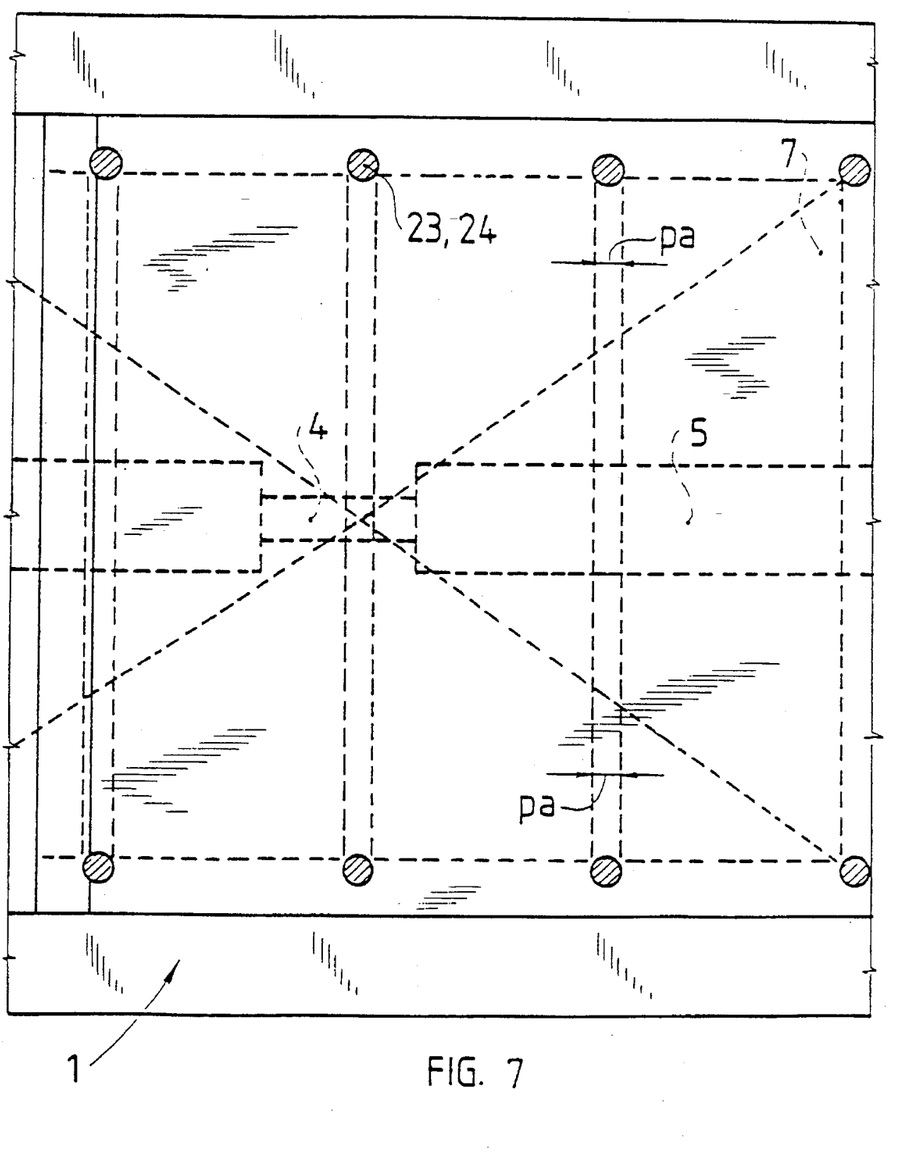
FIG. 7 shows diagrammatically a detail of the chilling cabinet in plan view, illustrating the arrangement of the vertical mold guides.

FIG. 7 shows a plan view of part of the chilling cabinet 1 traversed by the shaft 4 supporting the form 7 conveying screws 5. In order to ensure that the forms 7 are kept at a uniform distance during their vertical movement, that is in order to ensure that the forms 7 maintain throughout their vertical movement—that is when disengaged from the screws 5—a constant mutual pitch (pa), guiding and distancing posts or rods 23, 24 are provided against the vertical walls of the chilling cabinet 1 structure for the forms 7.

Figure 8:
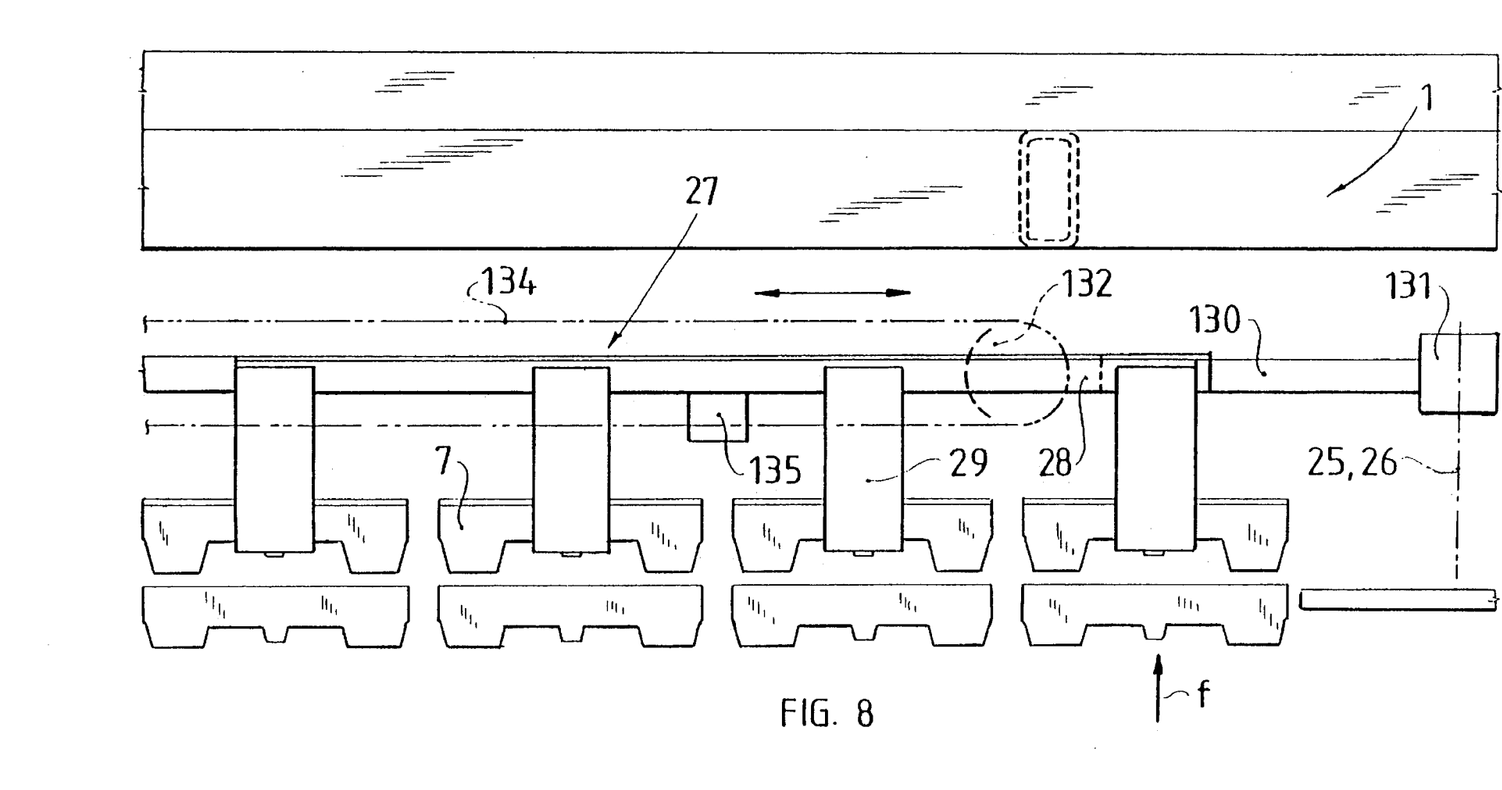
FIG. 8 shows a diagrammatic view of part of the carrier for the horizontal conveyance of the molds.

Visible in FIG. 8 is a view of a detail of the carrying unit 27.

The carrying unit 27 for the molds 7 consists basically of a carriage 28 equipped with controllable gripping members 29 capable of engaging with and disengaging from the molds 7 of the top row of the column P. The carriage 28 is supported by parallel guides 130 which, through a terminal enlargement 131, are connected to vertical screws 25, 26 which can be actuated in a controlled manner, for example by a controllable reducing mechanism, which is not illustrated.

It will thus be possible to position the unit 27 at a desired level within the chilling cabinet 1 and thereby determine and define the functional height of the chamber 3 of the chilling cabinet 1, adapting the same to the specific cooling needs of individual products.

Between the parallel guides 130, supported on transmission wheels 132, 133, is a toothed belt 134 fastened to a projection 135 that forms part of the carriage 28.

By connecting one of the transmission wheels 132 or 133 to a controllable actuating means, it will be possible to move the carriage 28 back and forth together with the gripping members 29 and the molds 7 locked between the gripping members 29, so that always the top row of the molds 7 of the ascending column (f) can be moved towards the top of the descending column (g).

Figure 9:
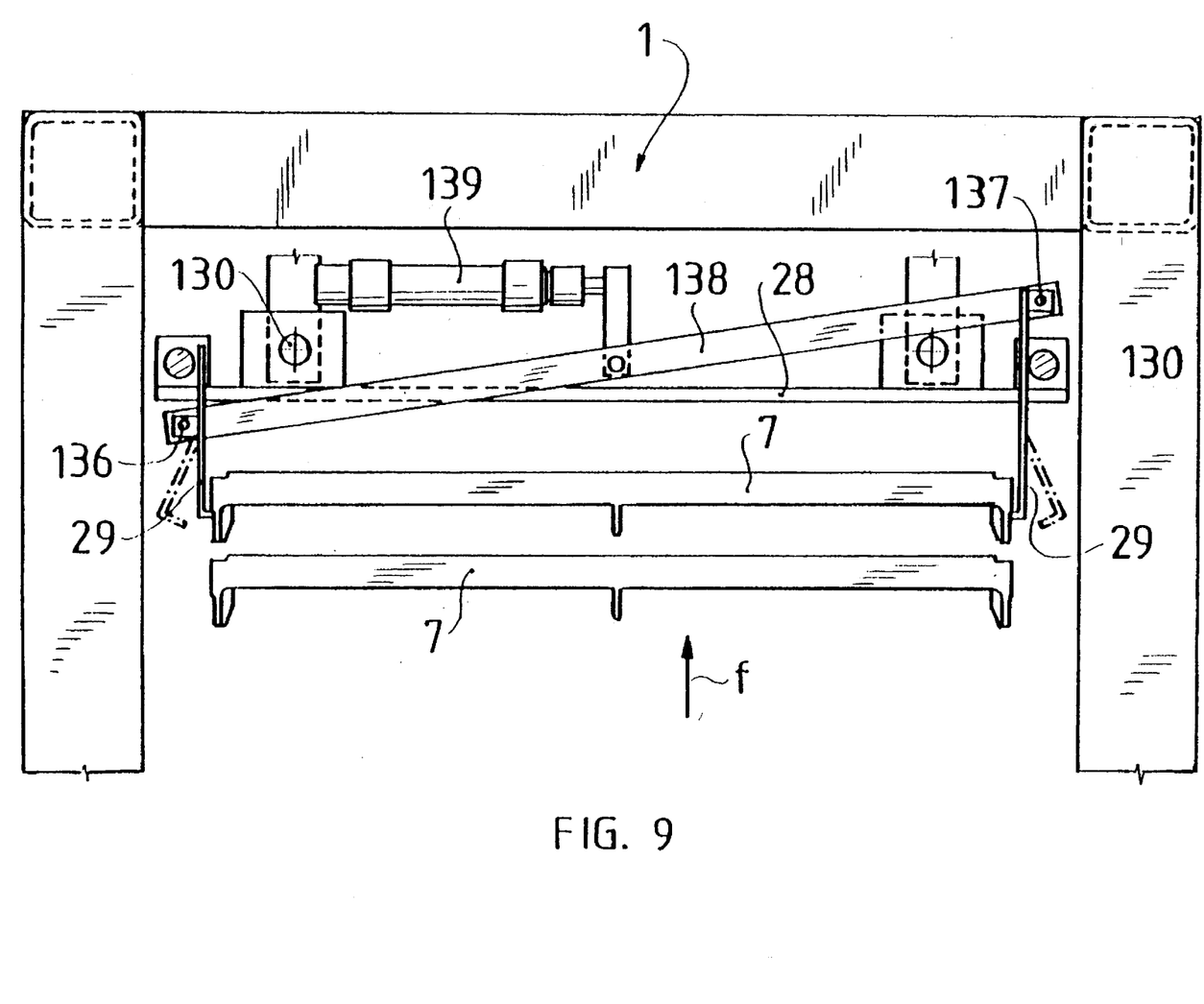
FIG. 9 shows a front view of the means on which the molds to be moved by the horizontal carrier are hooked.

The operation of the gripping members 29 can also be seen in the illustration of FIG. 9.

Observing this illustration, it can be seen that the structure of the chilling cabinet 1 comprises parallel guides 130 along which the carriage 28 can run back and forth. For each mold 7 the carriage 28 is equipped on opposite sides with controllable gripping members 29.

The gripping members 29 of the carriage 28 are supported in such a way that they can pivot, permitting a controlled movement of the L-shaped arms 29 from a locking position (indicated in solid lines) to an open position indicated in broken lines.

Each arm is connected in a jointed manner at the points 136 and 137 to an inclined bar 138 which is connected functionally to a cylinder-and-piston unit 139 making it possible to transmit to the arms 29 a closing movement (to hold the molds 7) and an opening movement (to transfer the molds 7).

The chilling cabinet 1 designed according to the present invention operates as follows:

In order to commence the cycle of cooling the product inside the chilling cabinet 1, it is necessary firstly to determine the level to which the chamber 3 of the chilling cabinet is to be filled. This is done by positioning the carrying unit 27 at the appropriate height by adjusting the positioning screws 25, 26 (FIG. 1).

In the second step, the chamber 3 of the chilling cabinet 1 present above the mold 7 lowering platform 15 must be filled with molds 7 (up to the maximum filling level), although the top row of molds 7 is removed, in order that the carrier 27 can deposit on the last row of forms 7, positioned further down, a row of molds 7 taken from the top of the ascending column (f) of molds 7 that will be forming above the lifting platform 14.

After these preliminary operations begins the actual feeding in of the molds 7 to the chilling cabinet 1. This is done by means of the conveying screw 5 which begins to feed the molds 7 filled with product to be cooled into the chilling cabinet 1. When, for example, four molds 7 have been fed in by the screw 5 and are in position above the platform 14, as illustrated in FIG. 1, the piston 12 of the electromechanical jack marked 10 is activated, and hence the series of molds 7 is transferred by the ascending movement of the platform 14 to the gripping means 50, 51 of the holding device 21. Next, the platform 14 descends again to collect another series of molds 7 fed in the meantime by the screw 5, and the platform 14 then rises again to feed another series of molds 7 to the holding device 21.

The operations described thus far are repeated until the stack P of ascending molds (f) has grown vertically to fill the corresponding chamber 3 up to the level at which the carrying device 27 is positioned.

The carrying carriage 27 then commences its own work, in the sense that it grasps the top row of molds 7 with its controllable gripping means 29.

Next, the carrying belt 134 is set in motion and the molds 7 grasped by the gripping means 29 are moved horizontally until the molds 7 are positioned above the descending (g) column P. The molds 7 are then transferred to the row of top molds 7 of the descending column P. The controllable gripping members 70, 71 of the transferring device 22 positioned above the platform 15 transfer the molds 7 of the bottom row of the descending (g) column P, and the platform 15 receives the molds 7. The electromechanical jack 11 is actuated, causing the platform to execute a descending movement (g), thereby transferring the molds 7 to the screw 5, which then discharges the molds 7 from the chamber 3 of the chilling cabinet 1.

I claim:

1. A chilling cabinet for continuously chilling chocolate material contained in a plurality of molds, comprising:

a) a housing having an entrance and an exit;

b) means for moving the molds into the entrance, and for discharging the molds from the exit;

c) stacking means for lifting and stacking the molds after entry into the housing;

d) means for holding and releasing the lowest mold of the stacked molds in an ascending column in the housing;

e) means for conveying the stacked molds upwardly from the stacking means along the ascending column to a carrier operative for horizontally conveying the molds to a top of a descending column in the housing;

f) unstacking means for lowering and unstacking the molds along the descending column; and g) means for holding and releasing the lowest mold of the stacked molds in the descending column prior to discharge from the housing.

2. The cabinet of claim 1, wherein the means for moving the molds includes a conveyor and means for spacing adjacent molds apart by a predetermined distance.

3. The cabinet of claim 1, wherein each of the stacking and unstacking means includes an electromechanical drive and means for vertically guiding the stacked molds.

4. The cabinet of claim 1, wherein the holding means includes gripping arms for pivoting between open and closed positions in which the arms respectively release and hold the lowest mold.

5. The cabinet of claim 1, and further comprising means for adjusting the elevation of the carrier within the housing above the ascending and descending columns.

6. The cabinet of claim 1, wherein the carrier includes gripping levers for pivoting between open and closed positions in which the levers respectively release and hold the highest mold of the stacked molds in the ascending column.

7. The cabinet of claim 6, wherein the carrier further includes a horizontal guide supported on spaced apart wheels, and a drive for reciprocatingly moving the carrier.

* * * * *